Figure 1:
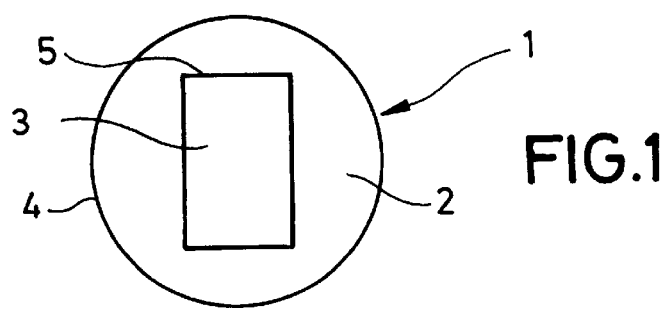

United States Patent [19]

Häring

[11] Patent Number: 5,774,585

[45] Date of Patent: Jun. 30, 1998

[54] METHOD OF DETERMINING THE SHAPE OF A BODY

[75] Inventor: Franz Häring, Neutraubling, Germany

[73] Assignee: Krones AG Hermann Kronseder Maschinenfabrik, Germany

[21] Appl. No.: 560,363

[22] Filed: Nov. 17, 1995

[30] Foreign Application Priority Data

Dec. 8, 1994 [DE] Germany ............................ 44 43 728.5

[51] Int. Cl.⁶ ..................................................... G06K 9/46
[52] U.S. Cl. ......................... 382/203; 382/196; 382/199; 382/201
[58] Field of Search ................................. 382/196, 199, 382/201, 202, 203, 225, 299, 190, 295, 259, 254, 256, 266; 356/375, 376

[56] References Cited

U.S. PATENT DOCUMENTS 3,963,866   6/1976   Tanie ......................................... 178/7.2
4,545,067  10/1985   Juvin et al. ................................ 382/21
4,845,764   7/1989   Ueda et al. .................................. 382/8
5,351,310   9/1994   Califano et al. ......................... 382/203
5,638,462   6/1997   Shirakawa ................................ 382/203

FOREIGN PATENT DOCUMENTS 32 38 300 A1  of 0000  Germany.
41 35 881 A1  of 0000  Germany.

OTHER PUBLICATIONS

Brauwelt ("Brewing World") No. 33 (1995) pp. 1649–1652.
Design & Electronic 5, Feb. 2, 1991, pp. 98–109.
Neimann "Methoden der Mustererkennung" (Methods for the Recognition of Samples) Akademische Verlagsgesellschaft Frankfort a.M. 1974, pp. 360–365, 401–405.

Primary Examiner—Edward L. Coles
Assistant Examiner—Madeleine Au Nguyen
Attorney, Agent, or Firm—Tilton, Fallon, Lungmus & Chestnut

[57] ABSTRACT

In order to permit a method of determining the shape of a body, which comprises the step of detecting a contour of said body, to be executed rapidly and with little computing effort, the contour of the body is converted into a contour function which is independent of the position of said body, and said contour function is compared with a predetermined reference contour function for a known shape.

16 Claims, 2 Drawing Sheets

METHOD OF DETERMINING THE SHAPE OF A BODY

The present invention refers to a method of determining the shape of a body, comprising the step of detecting a contour of said body. A method of this type is known from U.S. Pat. No. 3,963,866. In said U.S. patent, a circular area is exposed to light and subsequently scanned by a camera, which detects a difference in the brightness inside and outside of said circular area. The shape of the circular area can then be detected on the basis of the position of the points at which the brightness intensity changes from bright to dark or from dark to bright. Following this, the shape can be supplied to an industrial robot which can derive therefrom the shape or the position of a workpiece.

A method of the type mentioned at the beginning is also used in bottle-filling plants and, in particular, in bottle base inspection processes. Each bottle contains a receptacle which is arranged on the base of said bottle. During inspection, the bottles are exposed to light from above and the outlines of the bottle and of the receptacle are detected by a detection system. In order to guarantee that the outline detected is actually that of a receptacle and not that of dirt on the base of the bottle, the outline detected, which has a definite shape due to the structure of the receptacle, is compared with a corresponding standard shape. In view of the fact that the bottles and also the receptacles in said bottles are never oriented such that they occupy a specific position, it will be necessary to rotate or to displace the detected shape relative to the standard shape during this comparison until a possible congruence of the detected shape and of the standard shape occurs.

In the known method, the comparison between the detected shape and the standard shape necessitates major computing efforts, since it is especially necessary to rotate the shapes relative to one another. This has the effect that such methods are time-consuming and that a working process, in which such methods are used, is consequently slowed down.

Furthermore, a method is known, which comprises the steps of determining from the contour ascertained the centre of gravity of the area and the principal axes of inertia of the body and of rotating them subsequently in such a way that the contour ascertained will be moved to a predetermined position. Following this, the distance between each point of the contour and the closest point of a reference contour of a reference body is calculated. If the distance sum falls below a specific value, the shape of the body which is to be ascertained is equated with the reference body. When this method is used, the body must be visible completely so as to ascertain the whole contour, since, otherwise, neither the centre of gravity of the area nor the principal axes of inertia can be determined. In addition, the calculation of the distance sum necessitates a large amount of computing work, since the closest point of the reference body must be searched for in connnection with each point of the contour.

It is therefore the object of the present invention to further develop the method of the type mentioned at the beginning in such a way that it will provide the desired result reliably, rapidly and with little computing effort.

In order to achieve this object, the present invention suggests that the contour of the body should be converted into a contour function which is independent of the position of said body and that said contour function should be compared with a predetermined reference contour function for a known shape. The method according to the present invention determines a contour function which is independent of the position of the body. It is thus possible to dispense with all computing steps with regard to a displacement or a rotation carried out for moving the detected contour to the same position as the predetermined reference contour. The contour function can directly be compared with the reference contour function, whereby the shape of the body can be determined rapidly and with little computing effort. If the comparison shows that the two functions correspond, the shape of the body corresponds to the predetermined reference shape.

In order to make the contour function independent of the position of the body, a preferred embodiment of the present invention provides the feature that the conversion of the contour is effected by an angle- and position-independent transformation which is representative of an inner structure of the contour. The formulation inner structure of the contour describes pieces of information which concern the contour and which are independent of the angular position and the position of said contour. Such pieces of information can be the length of the contour or the area enclosed by said contour. In accordance with an advantageous embodiment, said inner structure refers to a curvature of the contour so that the curvature will be determined for the transformation.

An additional embodiment of the present invention provides the features that the contour is first represented as a number of points or pixels P(i), and that the numbering of the points is then modified such that a number M of the points for a specific contour is independent of the angular position of said contour. The points are thus numbered consecutively in a manner which is independent of the position of the contour and of the position of the body, respectively. If the same contour is positioned e.g. horizontally and diagonally, it will have the same number of points.

For determining the curvature of the contour, a further development of the present invention provides the feature that the angle between two respective chords extending from a point on the contour is determined. In this connection, each point of the contour can be a common starting point for the two chords in accordance with an advantageous embodiment.

In order to make the transformation independent of the position and the angular position of the contour, a further development of the present invention provides the features that, when the transformation is carried out, with each point P (i) of the contour is associated the corresponding angle y (i) between the two chords extending from the respective point P (i) and that a contour function is obtained, which depends on the numbering of the points.

Another expedient embodiment is that, when the contour function is compared with the reference contour function, the maximum cross correlation between these two functions is determined over the whole length of the contour or over a length of a subcontour. This permits a determination of the shapes of bodies which are visible completely as well as of bodies which are only visible in a certain area thereof.

The method according to the present invention is especially used for determining the outer circumference of a gas-filled receptacle in a bottle travelling through a bottle-filling plant.

Figure 2A:
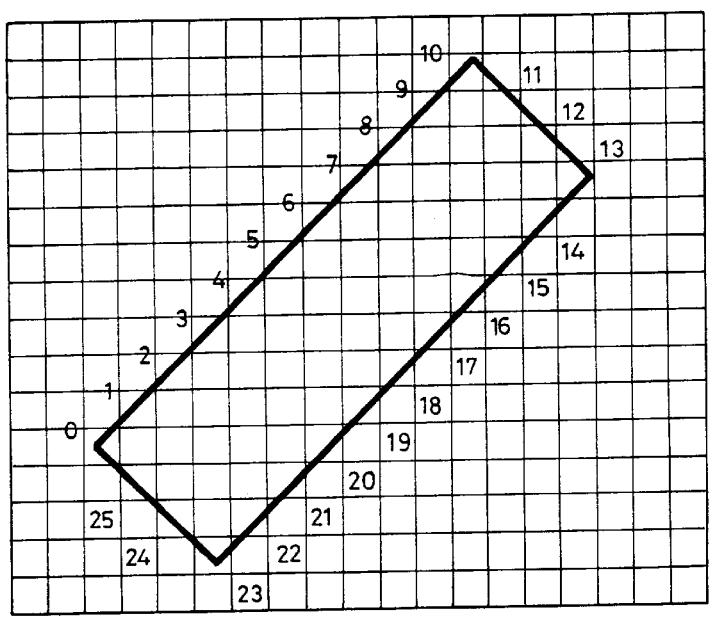
Figure 2B:
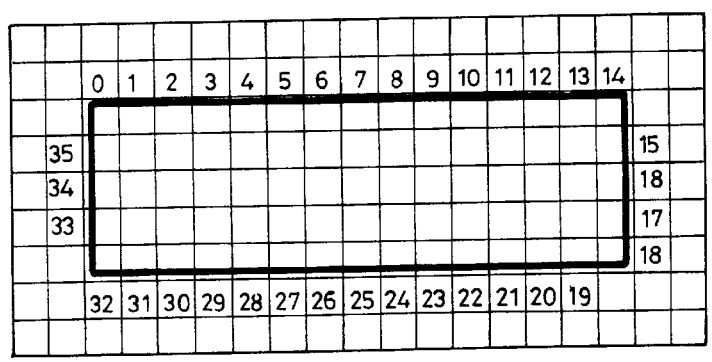
Figure 2C:
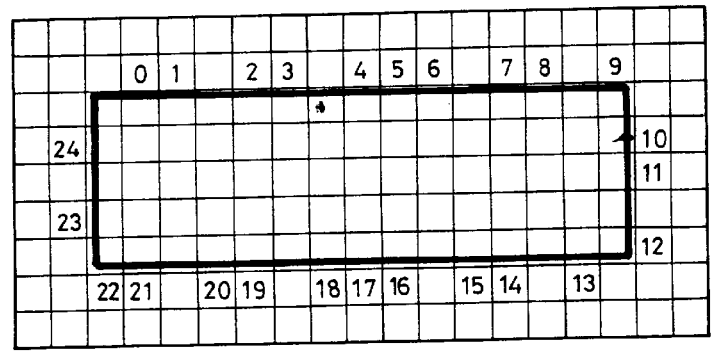
Figure 3:
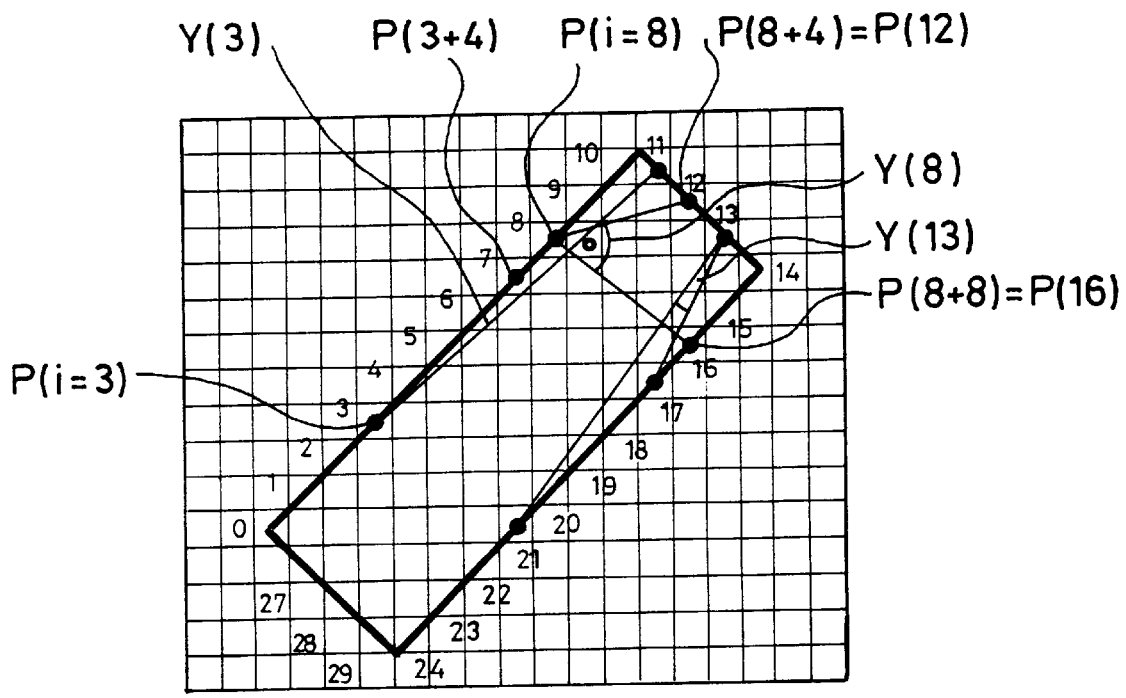
Figure 4:
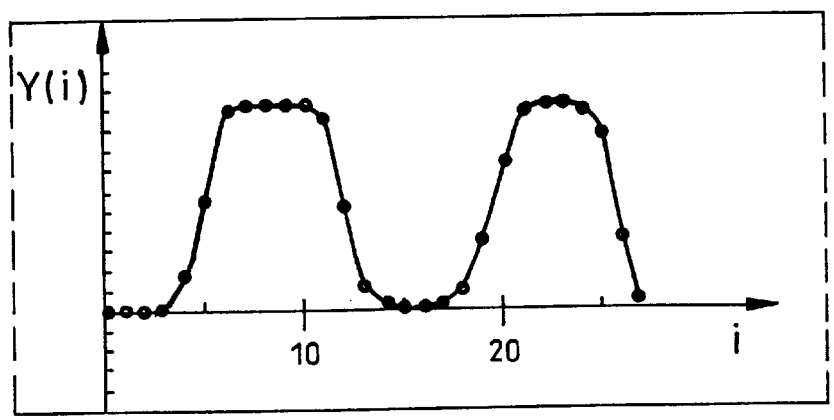

In the following, the present invention will be explained in detail on the basis of the drawing. The drawing shows an embodiment of the present invention. The individual figures of the drawing show:

FIG. 1 a view of the base of a bottle having a body arranged therein,

FIG. 2a a detected contour of said body at a 45° position shown in a two-dimensional coordinate system, FIG. 2b a detected contour at a 0° position, FIG. 2c a representation according to FIG. 2b with modified numbering, FIG. 3 a representation according to FIG. 2a, which shows the determination of the contour function and FIG. 4 the contour function determined on the basis of the contour of the body.

The first step of the method according to the present invention is that a bottle 1 containing a body 3, which is arranged on the base 2 of said bottle, is exposed to light from above. An outline 4 of the bottle 1 and an outline or a contour 5 of the body 3 are detected by means of light-sensitive detectors, which are arranged below the base 2 of the bottle, and stored in a two-dimensional coordinate system located in the plane of the base of the bottle. In view of the fact that the contour of the body is recorded by a video camera, storage is effected in a video memory in which the picture elements are aranged in lines and columns. If the picture elements or pixels are square, like in a Cartesian coordinate system, there will be two distances, the horizontal and the vertical distance, which are equal, and the diagonal distance which is obtained from the said horizontal distance and said vertical distance by multiplication with the factor $\sqrt{2}$. If a contour extends in such a coordinate system in an arbitrary manner, i.e. horizontally, vertically and diagonally, the distance between points on such a contour is not constant due to the different horizontal or vertical distance and the diagonal distance. In order to obtain a constant distance, the contour is subdivided into a number of points P(i), the numbering of the points being modified in a specific way. When the contour extends diagonally within a pixel, this will be rated as a whole point and the numbering f for this point will be defined through an algorithm f:=f+1. When the contour extends horizontally or vertically within a pixel, this will be rated lower, and the numbering f will be defined through an algorithm f:=f+1/$\sqrt{2}$. The number of the point is defined as the integer part of f, the first point of two points being omitted, if two points have the same number. This modified numbering is shown in FIGS. 2a–2c. In FIG. 2a, the left upper side of the contour extends diagonally across the pixels. The pixel in which the left upper side begins is set as point 0. The contour continues in the next pixel, a change of lines in the coordinate system indicating that the contour extends diagonally. According to the algorithm, this pixel is then set to 1:=0+1. The contour continues to extend diagonally so that the next point is set to 2:=1+1. In this way, the whole contour is subdivided into a number M of points P(i). According to FIG. 2a, the contour has 28 points, viz. the points P(0) to P(27).

FIG. 2b shows how the points are numbered without modification. The upper side of the same contour as in FIG. 2a is viewed again, the contour being now at a 0° position, i.e. it is positioned horizontally. At the left end of the upper side, point 0 is fixed. The next pixel is set as point (1), the next pixel as point (2) and so on. In this way, the upper side is subdivided into points P (0) to P (14). The whole contour has 40 points, viz. from P (0) to P (39). In view of the fact that the contour shown in FIG. 2a and 2b is the same contour, the distance between the points in the contour according to FIG. 2b is smaller, said distance being smaller precisely by the factor $\sqrt{2}$.

FIG. 2c shows the modified numbering. Beginning again at the left end of the upper side, the pixel is set as point P(0).

The contour extends horizontally to the next pixel; this being shown, for example, by the fact that the contour extends in the same line. Since the contour extends horizontally, the next point is set to 0 because 0.71:=0 +1 $\sqrt{2}$. The number of the point is the integer part of f, i.e. 0.

The next point is set to 1, since 1.42=0.71+0.71. The next point is set to 2, since 2.13=1.42+0.71. When the next point is calculated we have 2.84=2.13+0.71. In view of the fact that two points now have the same number, viz. 2, one of the two, e.g. the first one, is omitted. Due to this modified numbering, the upper side of the contour in FIG. 2c is subdivided into 10 points, viz. from P (0) to P (10). It has, consequently, the same subdivision as the contour according to FIG. 2a so that the distances between the points are approximately constant.

The determination of the contour function is now explained on the basis of FIG. 3. Each point P(i) of the curve is a common starting point for two chords to the points P $(i+j_1)$ and P $(i+j_2)$. The values $j_1$ and $j_2$ can be chosen arbitrarily. In FIG. 3, $j_1$=4 and $j_2$=8. It follows that, in the case of the point i=8, a chord extends from point P (8) to P (12), and the other chord extends from point P (8) to point P (16). For the point i=3 and the point i=13, the chords are also shown in FIG. 3. The angle between the chords starting from point P (8) is determined and associated with an angular value y (8). This calculation of the angular values is carried out for all points P (i). In this way, the curvature of the contour is determined. The amount of all angular values makes up the contour function, which is determined by associating the angular values y (i) with the numbers i of the points P (i).

The contour function is now compared for each value with a fixedly predetermined reference contour function for a specific reference body. The reference contour function is determined in the same way as the contour function, said determination method being described hereinbefore. If the values of the contour function and the values of the reference contour function correspond for the same numbering values i, the shape of the body corresponds to the shape of the reference body. The shape of the body is, consequently, determined.

It is imaginable that the values y (i) of the contour function do not correspond to the values y r (i) of the reference contour function, although the shape of the body corresponds to the shape of the reference body. This special case will occur, if the starting point i=0 does not correspond to the starting point of the reference contour function. If the contour function does not correspond to the reference contour function, the numbering of the functional values will therefore be increased by the value M, M=1,2,3 etc., and the thus increased values will then be compared with the respective reference contour values y r (i). Figuratively speaking, this corresponds to a linear displacement of the contour function in the direction of the numbering i relative to the reference contour function. If the two functions correspond in case of an abitrary one of the increases in the numbering, the shape of the body has been determined again. The shape of the body thus determined can additionally be printed out or displayed on a screen. If the shape of the body is not determined, i.e. if the contour function and the reference contour function do not correspond, the bottle in which the body is arranged will be singled out.

The comparison between the contour function and the reference contour function can also take place via the determination of the maximum cross correlation. The cross correlation X is defined as $$X(j) = \sum_{i=0}^{m-1} y(i)^* yr(i+j)$$

The cross correlation is the sum of the products of two functional values of two functions, the one being derived from the other e.g. by a shift of value D. For a value j=D, in the case of which the two functions correspond, the cross correlation x(j=d) assumes its maximum value. It follows that, by determining the maximum of the cross correlation, it is possible to calculate the degree of correspondence between two mutually shifted functions as well as the amount of shift. For determining the maximum of the cross correlation, the sum X(j) is formed for all possible values of j. The value j, which is a measure of the shift, runs, like the value i, from 0 to m−1. When the maximum of the cross correlation X(j) has been determined for all values of j, the maximum value will be compared with a predetermined desired value. If this desired value is reached or exceeded, the contour function y(i) corresponds to the reference contour function y r (i). In practice, the computing time can essentially be reduced, when the minimum of the sum of the squares Q(j) is calculated instead of determining the maximum of the cross correlation, the sum of the differential squares Q(j) being defined as $$Q(j) = \sum_{i=0}^{m-1} [y(i) - yr(i+j)]^2$$
$$= \sum_{i=0}^{m-1} y(i)^2 + \sum_{i=0}^{m-1} yr(i+j)^2 - 2 * \sum_{i=0}^{m-1} y(i) * yr(i+j)$$
$$= c_1 + c_2 - 2 * X(j)$$

As can be seen from the equation for the sum of the differential squares, the last term in the sum represents twice the cross correlation X (j). It follows that the sum of the differential squares is also a measure of the correspondence of two functions. In contrast to the determination of the maximum of the cross correlation, where the cross correlation X (j) must first be formed for all values j, the determination of the minimum of the sum of squares Q (j) is carried out such that summing is discontinued if the sum reached exceeds the value of the hitherto smallest sum, since the complete sum can then not be smaller than the hitherto smallest sum under any circumstances. This optimization reduces the computing time to approximately one third of the computing time required for determining the maximum of the cross correlation.

By means of the method according to the present invention, the shape of a body can be determined with little computing effort and, consequently, rapidly, since it suffices to compare a contour function with an adequate reference contour function and since it is not necessary to rotate the determined shapes relative to one another.

I claim:

1. A method of determining the shape of a body, comprising the step of detecting a contour of said body, wherein said contour of said body is firstly stored into a cartesian coordinate system, then represented as a number of pixels or points P(i), and the numbering of said points is then modified such that a number M of said points for a specific said contour is independent of the angular position of said contour, said modified numbering being obtained by rating a diagonal orientation of said contour within a pixel as a whole point and by defining the numbering f for said point through an algorithm f:=f+1, and by giving a horizontal orientation or a vertical orientation of said contour within a pixel a lower rating, the numbering f being then defined through an algorithm f:=f+1/√2, and the number of said point being defined as the integer part of f, and with one of two of said points being omitted, if said two points have the same number, and next, said contour being represented as said number of pixels with said modified numbering is converted into a contour function which is independent of the position of said body and that said contour function is compared with a predetermined reference contour function for a known shape.

2. A method according to claim 1, wherein said conversion of said contour is effected by an angle- and position-independent transformation which is representative of an inner structure of said contour.

3. A method according to claim 1, wherein a curvature of said contour is determined for said transformation.

4. A method according to claim 1, wherein, for determining the curvature of said contour, the angle between two respective chords extending from a said point P (i) on said contour is determined.

5. A method according to claim 4, wherein each said point of said contour is a common starting point for said two chords.

6. A method according to claim 4 or 5, wherein when said transformation is carried out, each said point P (i) of said contour has associated therewith the corresponding angle y (i) between said two chords extending from each said respective point P (i), and that said contour function is obtained, which depends on the numbering of said points.

7. A method according to claim 4 or 5, wherein said first chord, which begins at said point P (i), extends to the point P (i+$j_1$) and that said second chord extends to the point P (i+$j_2$), with $j_1$ being smaller than $j_2$.

8. A method according to claim 1, 2, 3, 4 or 5 wherein at least one value y (i) of said contour function for said point P (i) of said contour is compared with at least one value y r (i) of said reference contour function for the same said point.

9. A method according to claim 1, 2, 3, 4 or 5, wherein the values of said contour function and the values of said reference contour function are compared for different points on said contour so as to recognize a said contour function which has been shifted by a certain amount relative to said reference contour function but is otherwise identical therewith.

10. A method according to claim 1, 2, 3, 4 or 5 wherein the length of said contour function is compared with the length of said reference contour function.

11. A method according to claim 1, 2, 3, 4 or 5, wherein the maximum cross correlation between said contour function and said reference contour function is determined over the whole length of said contour or over a length of a subcontour.

12. A method according to claim 1, 2, 3, 4 or 5, wherein the minimum of the sum of the squared differences of the values of said contour function and of said reference contour function is formed.

13. A method according to claim 1, wherein said body is a gas-filled receptacle in a bottle, especially in a bottle-filling plant.

14. A method according to claim 13, wherein said contour is the outer circumference of said receptacle.

15. A method according to claim 1, wherein said contour is detected with the aid of a scanning means.

16. A method according to claim 15, wherein said scanning means is provided with a photooptical device.

* * * * *